(12) United States Patent
Braithwaite

(10) Patent No.: US 7,715,785 B2
(45) Date of Patent: May 11, 2010

(54) SYSTEM AND METHOD FOR ESTIMATION AND COMPENSATION OF RADIATED FEEDBACK COUPLING IN A HIGH GAIN REPEATER

(75) Inventor: Richard Neil Braithwaite, Orange, CA (US)

(73) Assignee: Powerwave Technologies, Inc., Santa Ana, CA (US)

( * ) Notice: Subject to any disclaimer, the term of this patent is extended or adjusted under 35 U.S.C. 154(b) by 26 days.

(21) Appl. No.: 11/788,181

(22) Filed: Apr. 19, 2007

(65) Prior Publication Data

US 2007/0249283 A1  Oct. 25, 2007

Related U.S. Application Data

(60) Provisional application No. 60/793,873, filed on Apr. 21, 2006.

(51) Int. Cl.
  *H04B 7/15* (2006.01)
  *H04B 3/36* (2006.01)
  *H04B 7/14* (2006.01)

(52) U.S. Cl. ................. 455/11.1; 455/7; 455/15; 455/16

(58) Field of Classification Search ............... 455/11.1, 455/7, 16, 15, 14, 9, 375, 211, 1.1
See application file for complete search history.

(56) References Cited

U.S. PATENT DOCUMENTS

| 4,383,331 | A  | * | 5/1983 | Davidson ................ 455/24 |
|-----------|----|---|--------|---------------------------------|
| 5,115,514 | A  | * | 5/1992 | Leslie ..................... 455/9 |
| 5,963,847 | A  |   | 10/1999 | Ito et al. |
| 6,385,435 | B1 | * | 5/2002 | Lee ......................... 455/24 |
| 6,697,603 | B1 | * | 2/2004 | Lovinggood et al. ...... 455/13.1 |
| 6,745,003 | B1 | * | 6/2004 | Maca et al. ............. 455/11.1 |
| 6,889,033 | B2 | * | 5/2005 | Bongfeldt ............... 455/11.1 |
| 7,009,573 | B2 | * | 3/2006 | Hornsby et al. ......... 343/770 |
| 2002/0181699 | A1 |  | 12/2002 | Pham et al. |
| 2004/0166802 | A1 | * | 8/2004 | McKay et al. ............ 455/15 |
| 2004/0235417 | A1 | * | 11/2004 | Dean ...................... 455/10 |
| 2008/0113617 | A1 | * | 5/2008 | Braithwaite ............. 455/7 |
| 2008/0176513 | A1 | * | 7/2008 | Braithwaite et al. ....... 455/24 |

* cited by examiner

*Primary Examiner*—Tilahun Gesesse
(74) *Attorney, Agent, or Firm*—Myers Andras Sherman LLP

(57) ABSTRACT

A system and method of compensating for the effects of the antenna coupling in on-frequency repeaters, whose input and output signals are the same frequency, are disclosed. The repeater is implemented with internal digitally determined compensation that reduces the effect of the antenna coupling, allowing the forward gain of the repeater to be increased. The real and imaginary components of the forward gain are dithered. The change in the power spectrum of the signal in response to the dithering is used to estimate the residual (uncompensated) feedback coupling.

9 Claims, 8 Drawing Sheets

SYSTEM AND METHOD FOR ESTIMATION AND COMPENSATION OF RADIATED FEEDBACK COUPLING IN A HIGH GAIN REPEATER

RELATED APPLICATION

The present application claims priority under 35 USC section 119(e) to provisional application Ser. No. 60/793,873 filed on Apr. 21, 2006, the disclosure of which is incorporated herein by reference in its entirety.

BACKGROUND OF THE INVENTION

1. Field of the Invention

The present invention relates to wireless communications systems. More particularly, the present invention relates to on-frequency repeaters, whose input and output signals have the same frequency, which are used to extend base station coverage in a cellular environment.

2. Description of the Prior Art and Related Information

In a wireless communication system, a mobile unit such as a cellular phone transmits and receives radio frequency (RF) signals to and from cell site base stations. Multiple users can share a common communication medium through technologies such as code division multiple access (CDMA), time division multiple access (TDMA), and global system for mobile communications (GSM).

Fading, caused by attenuation, delay, and phase shift of signals during propagation, particularly during multipath propagation, limits the base station coverage.

Repeaters are usually included in the system to receive, filter, and re-transmit signals of interest at a higher power level, thus extending base station coverage. The signals of interest received by a repeater may be from a base station, a mobile unit, or from another repeater. The forward gain of a repeater is an important characteristic of the repeater as it determines the amplified power level of the re-transmitted signals.

On-frequency repeaters have input and output signals at the same frequency. Thus, the coupling between the input and output signals is an issue. If the product of the forward gain of the repeater and the coupling between the input and output antennas is too high, the repeater will oscillate. In general, this is undesirable.

To avoid oscillations, the isolation between the input and output antennas must exceed the forward gain of the repeater. As a result, the forward gain of the repeater is often limited, typically, by the feedback associated with coupling between the input and output antennas. Although the antenna radiation patterns are designed to limit the coupling, in practice, some output power is still coupled to the input after various delays.

Accordingly, a need presently exists for a system and method for addressing this problem of repeater antenna coupling so that the forward gain of the repeater can be increased.

SUMMARY OF THE INVENTION

In a first aspect, the present invention provides an on-frequency repeater including an input antenna for receiving a signal, an output antenna for outputting an amplified signal, an amplifier for amplifying the received signal and providing the output signal to the output antenna, and an internal feedback path for estimating a coupling between the input antenna and the output antenna. The internal feedback path includes an adjustable gain unit for dithering a forward gain of the repeater and a circuit responsive to the dithered gain for estimating the coupling.

In a preferred embodiment the internal feedback is adapted to reduce the coupling based on the estimated coupling. In a preferred embodiment the on-frequency repeater further includes means for measuring a signal in the repeater, wherein the signal is measured before passing through the variable gain unit to estimate the coupling between the input antenna and the output antenna. In a preferred embodiment the means for measuring the signal includes means for measuring a power spectrum of the signal. In a preferred embodiment of the on-frequency repeater, the internal feedback path includes a digital signal processor (DSP) for iteratively calculating the coupling and for controlling the adjustable gain unit. The internal feedback path may further include a digital-to-analog converter for converting a feedback signal from the DSP to analog form before coupling the feedback signal to a signal path of the repeater.

The signal path may be an intermediate frequency (IF) path, and the converted feedback signal is coupled to the IF path of the repeater after an IF filter in the IF path. Alternatively, the signal path may be an intermediate frequency (IF) path, and the converted feedback signal is coupled to the IF path of the repeater before an IF filter in the IF path. In yet another alternative embodiment, the signal path may be a radio frequency (RF) path, and the internal feedback path further comprises an up converter for converting the feedback signal to RF before coupling the RF signal to the RF path.

According to another aspect the present invention provides a method for estimating a coupling between an input antenna and an output antenna of an on-frequency repeater. The method includes measuring a signal in a signal path of the on-frequency repeater, dithering a forward gain of the signal path, and calculating iteratively the coupling based on the measured signal and the dithered forward gain.

In a preferred embodiment of the method, calculating iteratively the coupling includes calculating a residual feedback coupling, finding significant residual coefficients, obtaining a list of dominant delay taps corresponding to the significant residual coefficients, updating residual coefficients based on the list of dominant delay taps, and repeating the above steps using updated residual coefficients until the list of dominant delay taps is empty. In a preferred embodiment, calculating the residual feedback coupling includes measuring a first power spectrum value of the signal in the signal path, varying a value of the forward gain, measuring a second power spectrum value of the signal in the signal path, calculating a first function using a difference between the first power spectrum value and the second power spectrum value, calculating a second function using a sum of the first power spectrum value and the second power spectrum value, and calculating the residual feedback using the first function and the second function.

In a preferred embodiment of the method, varying the value of the forward gain comprises varying the forward gain between an upper limit and a lower limit, and wherein an average value of the varied forward gain is a nominal forward gain. In a preferred embodiment, the method further includes removing an outlier in the measurement of the power spectrum. In a preferred embodiment, where the minimum delay through the repeater is $T_{min}$ removing an outlier comprises calculating a differential auto-correlation of the measured first power spectrum and the measured second power spectrum of the signal in the signal path at varying time delays and if the differential auto-correlation is larger than a predetermined threshold for a delay less than $T_{min}$, then removing the measured first power spectrum and the measured second power spectrum.

In a preferred embodiment of the method, obtaining the list of dominant delay taps includes identifying the dominant delay taps by comparing a value of a delay tap with a predetermined threshold. Preferably, the predetermined threshold is three times an average of the value of the delay tap.

In a preferred embodiment, the method further includes compensating for the coupling based on the iteratively-calculated coupling to reduce the coupling between the input antenna and the output antenna. Preferably, the method further includes increasing the forward gain of the repeater after the coupling is reduced.

According to another aspect, the present invention provides a wireless communication system, including a base station and an on-frequency repeater for extending the base station coverage. The on-frequency repeater includes an input antenna for receiving a signal, an output antenna for outputting an amplified signal, an amplifier for amplifying the received signal and providing the amplified output signal to the output antenna, and an internal feedback path for estimating a coupling between the input antenna and the output antenna. The internal feedback path includes means for dithering a variable gain in the internal feedback path, means for measuring a signal in the feedback path in response to the dithered gain, and means for iteratively calculating the coupling based on the variable gain and the measured signal.

Further aspects of the present invention are set out in the following detailed description.

DETAILED DESCRIPTION OF THE INVENTION

The present invention provides a system and method for estimating and reducing the effect of antenna coupling in on-frequency repeaters. In a preferred embodiment, an internal feedback path is used to estimate the coupling, by dithering a forward gain, and measuring a change in the power spectrum of a signal in the signal path in response to the dithering. The internal feedback path may also be used to compensate for the external coupling between antennas based on the estimated coupling, allowing the forward gain of the repeater to be increased if required. Thus, the present invention also provides an improved base station repeater.

Figure 1:
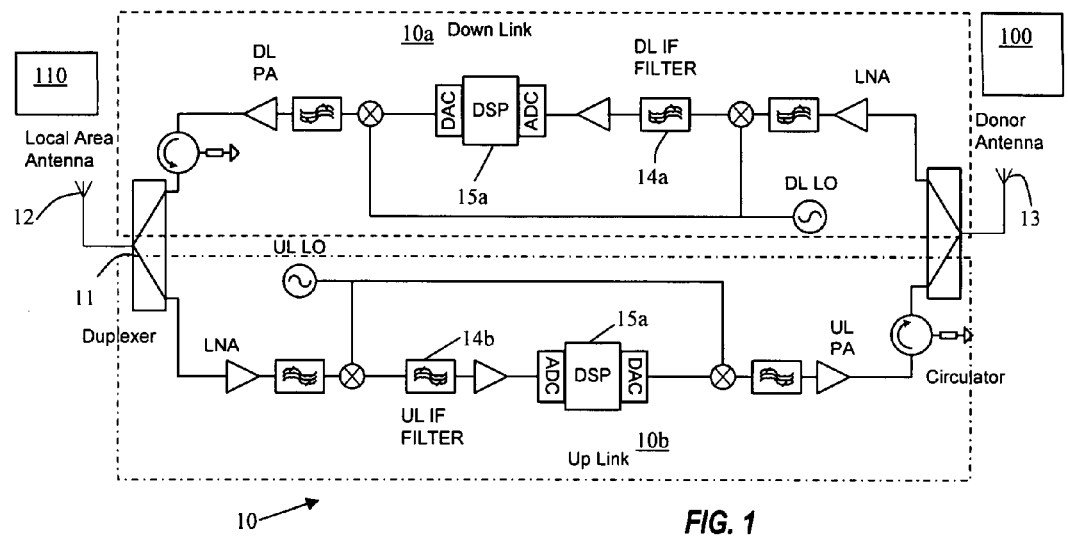
FIG. 1 is a block schematic drawing of a bi-directional on-frequency repeater in accordance with an embodiment of the invention.
Figure 2:
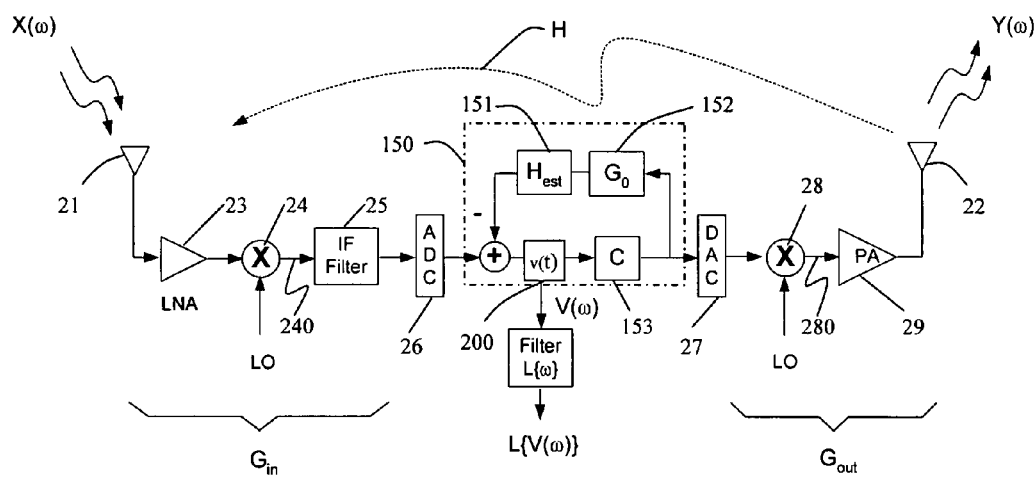
FIG. 2 is a block schematic drawing of one direction of the repeater showing compensation for radiated feedback in accordance with the present invention.

An on-frequency repeater in accordance with embodiments of the invention is shown in FIGS. 1 and 2. A repeater 10 is typically bi-directional, as shown in FIG. 1. The down-link 10a connects the base station 100 to the mobile 110, and the up-link 10b connects the mobile 110 to the base station 100. The up- and down-links 10a and 10b are separated in frequency requiring different local oscillators (LO). Duplexers 11 allow the up- and down-links 10a and 10b to share the local area antenna 12 (closest to the mobile) and the donor antenna 13 (closest to the base station). The up- and down-link stages perform substantially the same functions and may use the same components. Bandpass filtering is performed at an intermediate frequency (IF) using filters 14a and 14b. Automatic gain control (AGC) and compensation for the antenna coupling is performed in internal feedback paths within the up- and down-links 10a and 10b. The internal feedback paths may include feedback compensation units comprising digital signal processors (DSP) 15a and 15b.

The block diagram shown in FIG. 2 provides more details of the feedback paths. It also shows the coupling H between the input antenna 21 and the output antenna 22. The feedback compensation may be implemented in a DSP (as shown in FIG. 1). Other embodiments are possible where the DSP-based compensation may be converted to analog, and possibly up-converted in frequency, then coupled to the IF or RF path. These embodiments are described later.

The main components of the repeater as shown in FIG. 2 also include the low noise amplifier (LNA) 23, down-converting mixer 24, IF filter 25, analog-to-digital converter (ADC) 26, DSP (not shown), digital-to-analog converter (DAC) 27, up-converting mixer 28, and power amplifier (PA) 29.

As known to those skilled in the art, additional components may be included in the repeater 10. For example, first and second image reject filters may be included and located, e.g., between the LNA 23 and the down-converting mixer 24, and between the up-converting mixer 28 and the power amplifier 29, respectively. A first duplexer 11 is often found between the antenna 21 and LNA 23. A circulator and a second duplexer may be located, e.g., between the PA 29 and the output antenna 22. Additional gain stages may be present at various locations within the RF path 280 and the IF path 240.

The input signal, e.g., the in-coming signal without the effects of feedback, is denoted by x(t). The Fourier transform of x(t) is denoted by X(ω). The output signal and its Fourier transform are denoted by y(t) and Y(ω), respectively. The input signal X(ω), although used in the following for modeling, usually cannot be directly measured because it is difficult to separate X(ω) from the output signal Y(ω) through the coupling path H. What can be measured usually is a signal v(t)

within a signal path of the repeater, using measuring means 200, which may also measure the power spectrum of the signal v(t).

Within FIG. 2, the forward gain of the repeater is represented as the product of the three gain blocks: a static input gain $G_{in}$, a variable gain C, and a static output gain $G_{out}$. The variable gain C may be a digital gain controlled by the DSP. For notational convenience, the static forward gain is combined, and is denoted by $G_0 = G_{in} G_{out}$. The variable gain, C, is the complex weight used to dither the real and imaginary components of forward gain in order to estimate the coupling H.

The signal v(t), whose Fourier transform is denoted by $V(\omega)$, is a measurement made prior to the variable gain C. $V(\omega)$ includes the effect of the feedback coupling H, but does not include the direct effect of the variable gain C. The signal v(t) may be filtered by a linear filter operation whose frequency response is $L\{\omega\}$. The external feedback coupling is modeled as $$H(\omega) = \sum_{n=1}^{N} a_n \cdot \exp\{j \cdot \omega \cdot T_n\}, \quad \text{(Eq. 1)}$$

where $a_n$ are complex coefficients, and $T_n$ are loop delays. An estimate of the feedback coupling has the same form:

$$H_{est}(\omega) = \sum_{n=1}^{N} b_n \cdot \exp\{j \cdot \omega \cdot T_n\}, \quad \text{(Eq. 2)}$$

where $b_n$ are complex coefficients. In FIG. 2, the feedback path 150 is modeled with the estimate feedback coupling block 151, the static forward gain $G_0$ block 152, and an adjustable gain unit 153 for providing the variable gain C.

In the following analysis, the IF filter 25 shown in FIG. 2 is modeled as a delay element within the repeater. This approximation assumes that the passband of the IF filter 25 is flat and that its bandwidth is wider than the spectrum of the input signal of interest. If this assumption is not valid, the estimated feedback coupling, $H_{est}$, will be the product of the actual coupling, H, and the frequency response of the filter. This does not affect compensation; however, the number of dominant loop delay taps within (Eq. 2) will tend to increase due to the dispersion associated with the filtering.

The transfer function of the repeater, using the measurement signal v(t), may be written as $$V(\omega) = \frac{G_{in}}{1 - C \cdot G_0 \cdot (H - H_{est})} \cdot X(\omega). \quad \text{(Eq. 3)}$$

The input signal $X(\omega)$ usually cannot be measured because the input antenna 21 sums both $X(\omega)$ and the coupled signal from the output antenna 22, $H(\omega)Y(\omega)$. Statistical properties of the measured signal, v(t), may be used to estimate the feedback coupling H. In the present approach, the power spectrum of v(t) is used. The real and imaginary components of the forward gain are dithered to assist in the estimation and subsequent iterative search for the feedback coefficients, $b_n$.

The power spectrum of the measured signal, $S_v(\omega)$, written as a function of the input power spectrum, $S_x(\omega)$, is $$S_v(\omega) = \left| \frac{G_{in}}{1 - G_0 \cdot C \cdot \Delta H} \right|^2 \cdot S_x(\omega), \quad \text{(Eq. 4)}$$

where $\Delta H = H - H_{est}$ and is referred to herein as the "residual feedback coupling." The partial derivative of the measured power spectrum with respect to the real component of C is:

$$\frac{\partial S_v(\omega)}{\partial \text{Re}\{C\}} = \left[ \left\{ \frac{\Delta H}{A^2} \right\} \cdot \left\{ \frac{1}{A^*} \right\} + \left\{ \frac{\Delta H}{(A^*)^2} \right\} \cdot \left\{ \frac{1}{A} \right\} \right] \cdot |G_{in}|^2 \cdot S_x(\omega), \quad \text{(Eq. 5)}$$

where $$A = 1 - G_0 \cdot C \cdot \Delta H. \quad \text{(Eq. 6)}$$

(Eq. 5) can be rewritten as $$\frac{\partial S_v(\omega)}{\partial \text{Re}\{C\}} = \left\{ \frac{\Delta H}{A} + \frac{\Delta H^*}{A^*} \right\} \cdot \frac{|G_{in}|^2}{|A|^2} \cdot S_x(\omega). \quad \text{(Eq. 7)}$$

Using (Eq. 4), $S_x(\omega)$ can be removed from (Eq. 7), resulting in $$\frac{\partial S_v(\omega)}{\partial \text{Re}\{C\}} = 2 \cdot \text{Re}\left\{ \frac{\Delta H}{A} \right\} \cdot S_v(\omega). \quad \text{(Eq. 8)}$$

The partial derivative with respect to the imaginary component of the gain is $$\frac{\partial S_v(\omega)}{\partial \text{Im}\{C\}} = j \cdot \left\{ -\frac{\Delta H}{A} + \frac{\Delta H^*}{A^*} \right\} \cdot \frac{|G_{in}|^2}{|A|^2} \cdot S_x(\omega), \quad \text{or} \quad \text{(Eq. 9)}$$

$$\frac{\partial S_v(\omega)}{\partial \text{Im}\{C\}} = 2 \cdot \text{Im}\left\{ \frac{\Delta H}{A} \right\} \cdot S_v(\omega). \quad \text{(Eq. 10)}$$

From (Eq. 8) and (Eq. 10), it can be seen that dithering either the real or imaginary component of the forward gain, C, induces fractional changes in the measured power spectrum, $S_v(\omega)$, which is used later to obtain information regarding the antenna coupling H. Note that only one direction of the gain can be dithered at a given time. Adjusting both the real and imaginary components of C simultaneously will still only measure one dimension of the gain (at 45 degrees to the coordinate axes).

From (Eq. 8) and (Eq. 10), it can be seen that the real and imaginary components of $\Delta H(A)^{-1}$ are $$\text{Re}\left\{ \frac{\Delta H}{A} \right\} = \frac{0.5}{S_v(\omega)} \cdot \frac{\partial S_v(\omega)}{\partial \text{Re}\{C\}}, \quad \text{(Eq. 11)}$$

and $$\text{Im}\left\{ \frac{\Delta H}{A} \right\} = \frac{0.5}{S_v(\omega)} \cdot \frac{\partial S_v(\omega)}{\partial \text{Im}\{C\}}, \quad \text{(Eq. 12)}$$

respectively. The real and imaginary components of $\Delta H(A)^{-1}$ from (Eq. 11) and (Eq. 12) can be combined as a quantity $M(\omega)$:

$$M(\omega) = \frac{\Delta H}{1 - G_0 C \cdot \Delta H} = \text{Re}\left\{\frac{\Delta H}{A}\right\} + j \cdot \text{Im}\left\{\frac{\Delta H}{A}\right\}. \quad \text{(Eq. 13)}$$

From (Eq. 13), the estimate of the residual feedback coupling becomes $$\Delta H(\omega) = \frac{M(\omega)}{1 + G_0 \cdot C \cdot M(\omega)}. \quad \text{(Eq. 14)}$$

The estimate of the residual feedback coefficients, $b_n - a_n$, is obtained by performing an inverse discrete Fourier transform on (Eq. 14) (the digital form is discussed later, see (Eq. 25)). Alternatively, an inverse fast Fourier transform (IFFT) can be applied to $\Delta H$, which provides coefficient estimates for all delay taps.

There are various practical considerations when digitally implementing the system shown in FIG. 2. The frequency domain is sampled with a resolution of $\Delta \omega$, and the samples are denoted by $\omega_k = k\Delta\omega$, where k is an integer. The frequency resolution used in the power spectrum $S_v(\omega_k)$, the measurement $M(\omega_k)$, and the residual feedback coupling $\Delta H(\omega_k)$ is $$\Delta\omega = \frac{2\pi}{NT_{sample}}, \quad \text{(Eq. 15)}$$

where N is the number of samples in the power spectrum, and $T_{sample}$ is the temporal sampling interval of the signal v(t). To estimate the coefficients $b_n$ reliably, $\Delta\omega$ must be smaller than $2\pi/T_n$, preferably by some multiples. As a result, many samples are required when $T_n \ll T_{sample}$. In such cases it is preferable that the sampling interval be reduced as much as the bandwidth of the input signal will allow without significant aliasing.

In digital form, the derivatives used in (Eq. 11) and (Eq. 12) are approximated by differences. For (Eq. 11), the power spectrum $S_v$ is measured using two different forward gains, $C_1$ and $C_2$, where $$C_1 = C_0 - 0.5 \cdot \Delta Re\{C\}, \quad \text{(Eq. 16)}$$

and $$C_2 = C_0 + 0.5 \cdot \Delta Re\{C\}. \quad \text{(Eq. 17)}$$

The digital form of (Eq. 11) becomes $$\text{Re}\{M(\omega_k)\} = \frac{S_{v(2)}(\omega_k) - S_{v(1)}(\omega_k) + \varepsilon_{2-1}}{\Delta Re\{C\} \cdot [S_{v(2)}(\omega_k) + S_{v(1)}(\omega_k) + \varepsilon_{2+1}]} \quad \text{(Eq. 18)}$$

where $$\varepsilon_{2-1} = \lambda_{reg} \cdot \frac{\sum_{k=0}^{N-1}[S_{v(2)}(\omega_k) - S_{v(1)}(\omega_k)]}{N} \quad \text{(Eq. 19)}$$

$$\varepsilon_{2+1} = \lambda_{reg} \cdot \frac{\sum_{k=0}^{N-1}[S_{v(2)}(\omega_k) + S_{v(1)}(\omega_k)]}{N} \quad \text{(Eq. 20)}$$

and $\lambda_{reg}$ is a small positive constant. The $\varepsilon_{2-1}$ and $\varepsilon_{2+1}$ terms are included to reduce the effects of changes in the power spectrum $S_v$ resulting from input signal variations rather than variations in the feedback coupling. Similarly for (Eq. 12), the power spectrum $S_v$ is measured using two different forward gains, $C_3$ and $C_4$, where $$C_3 = C_0 - 0.5 \cdot \Delta Im\{C\}, \quad \text{(Eq. 21)}$$

and $$C_4 = C_0 + 0.5 \cdot \Delta Im\{C\}. \quad \text{(Eq. 22)}$$

The difference approximation for (Eq. 12) becomes $$\text{Im}\{M(\omega_k)\} = \frac{S_{v(4)}(\omega_k) - S_{v(3)}(\omega_k) + \varepsilon_{4-3}}{\Delta Im\{C\} \cdot [S_{v(4)}(\omega_k) + S_{v(3)}(\omega_k) + \varepsilon_{4+3}]}. \quad \text{(Eq. 23)}$$

In general, the use of (Eq. 18) and (Eq. 23) tends to underestimate the magnitude of the residual coefficients $(b_n - a_n)$; however, this is compensated by the iterative process, discussed below, which forces $|b_n - a_n|$ to converge to zero after some iterations.

Within the iterative process, the update of the coefficient $b_n$ is $$b_n(t_{i+1}) = b_n(t_i) + \gamma \cdot \Delta b_n \quad \text{(Eq. 24)}$$

where $\gamma$ is a convergence constant and $\Delta b_n$ is the estimate of the residual coupling for the coefficient associated with loop delay $T_n$. The estimate of the residual coupling is $$\Delta b_n = \sum_k \Delta H(\omega_k) \cdot \exp\{-j \cdot k \cdot \Delta\omega \cdot T_n\}, \quad \text{(Eq. 25)}$$

which is the inverse discrete Fourier transform of $\Delta H(\omega_k)$ for delay $T_n$. If the dominant delay taps in (Eq. 1) are known, only those coefficients need to be computed. For an unknown delay spread, all N delay taps are computed using an inverse FFT of $\Delta H(\omega_k)$, after which the dominant delay taps are selected.

Consider the case where the signal v(t) is filtered after being extracted from the forward signal path, as shown in FIG. 2. The filtered power spectrum, denoted by $S_{L\{v\}}(\omega_k)$, becomes $$S_{L\{v\}}(\omega_k) = |L(\omega_k)|^2 \cdot S_v(\omega_k). \quad \text{(Eq. 26)}$$

Since (Eq. 18) and (Eq. 23) are the ratios of the difference and sum of two power spectra, the filtering $|L(\omega_k)|^2$ does not affect the estimate of M directly, as long as the same filter is applied to both each pair of spectra ($S_{v(1)}$ and $S_{v(2)}$, or $S_{v(3)}$ and $S_{v(4)}$). The filtering affects the relative influence of $\varepsilon_{2-1}$, $\varepsilon_{2+1}$, $\varepsilon_{4-3}$, and $\varepsilon_{4+3}$ in the estimation of $M(\varepsilon_k)$: they become more significant at frequencies where the attenuation of $|L(\varepsilon_k)|$ is higher. Filtering becomes useful when small offsets are added to the denominators of (Eq. 18) and (Eq. 23), which allows noisy portions of the spectrum to be discounted.

Shorter segments of data can be integrated to obtain the estimate of $M(\varepsilon_k)$:

$$\text{Re}\{M(\omega_k)\} = \frac{\sum_t \Delta Re\{C\} \cdot [S_{v(2)}(\omega_k) - S_{v(1)}(\omega_k) + \varepsilon_{2-1}]}{\sum_t |\Delta Re\{C\}|^2 \cdot [S_{v(2)}(\omega_k) + S_{v(1)}(\omega_k) + \varepsilon_{2+1}]}, \quad \text{(Eq. 27)}$$

$$\text{Im}\{M(\omega_k)\} = \frac{\sum_t \Delta \text{Im}\{C\} \cdot [S_{v(4)}(\omega_k) - S_{v(3)}(\omega_k) + \varepsilon_{4-3}]}{\sum_t |\Delta \text{Im}\{C\}|^2 \cdot [S_{v(4)}(\omega_k) + S_{v(3)}(\omega_k) + \varepsilon_{4+3}]} \quad \text{(Eq. 28)}$$

Integrating shorter sequences allows the real or imaginary parts of the variable gain, C, to be ramped up and down in smaller increments that will not affect significantly the bit error rate at the receiver of the base station or the mobile. It also makes the estimation less sensitive to dynamics in the signal statistics.

By using smaller increments in either $|\Delta \text{Re}\{C\}|$ or $|\Delta \text{Im}\{C\}|$, the difference between neighboring spectra due to the feedback is reduced. Thus, large differences are due in part to variations in the waveform statistics. Measurements originating from such spectral pairs are removed from (Eq. 27) and (Eq. 28).

The above-mentioned approach assumes that the statistics of the input signal x(t) remains constant between two neighboring measurements of the power spectrum. This assumption of constant input signal statistics can be verified if the minimum delay through the repeater, $T_{min}$, is known. Variations in $\Delta b_n$ wherein $T_n < T_{min}$ indicate changes in the input statistics over the dithering interval and that the estimate of M is corrupted. However, it is more useful to identify changes between pairs of the measurements before adding them to (Eq. 27) and (Eq. 28). Let the auto-correlation be denoted by $\rho_t(\tau) = \text{IFFT}\{S_{v(t)}\}$ and the differential auto-correlation be denoted by $\Delta \rho_t(\tau) = \rho_{t+1}(\tau) - \rho_t(\tau)$. If $|\Delta \rho(\tau)|$ is greater than $0.05 \rho_t(0)$ for any delay $\tau < T_{min}$, the measurements are excluded from (Eq. 27) and (Eq. 28). Thus, the statistics of the input signal x(t) may change over the dithering interval as long as they are constant between pairs of measurements.

The delay through the repeater is usually dominated by the insertion delay of the IF filter 25. As a result, the insertion delay of the IF filter 25 may be used as a conservative lower bound on the minimum delay, $T_{min}$, when determining if pairs of measurements should be excluded from (Eq. 27) and (Eq. 28) as outliers.

Figure 3:
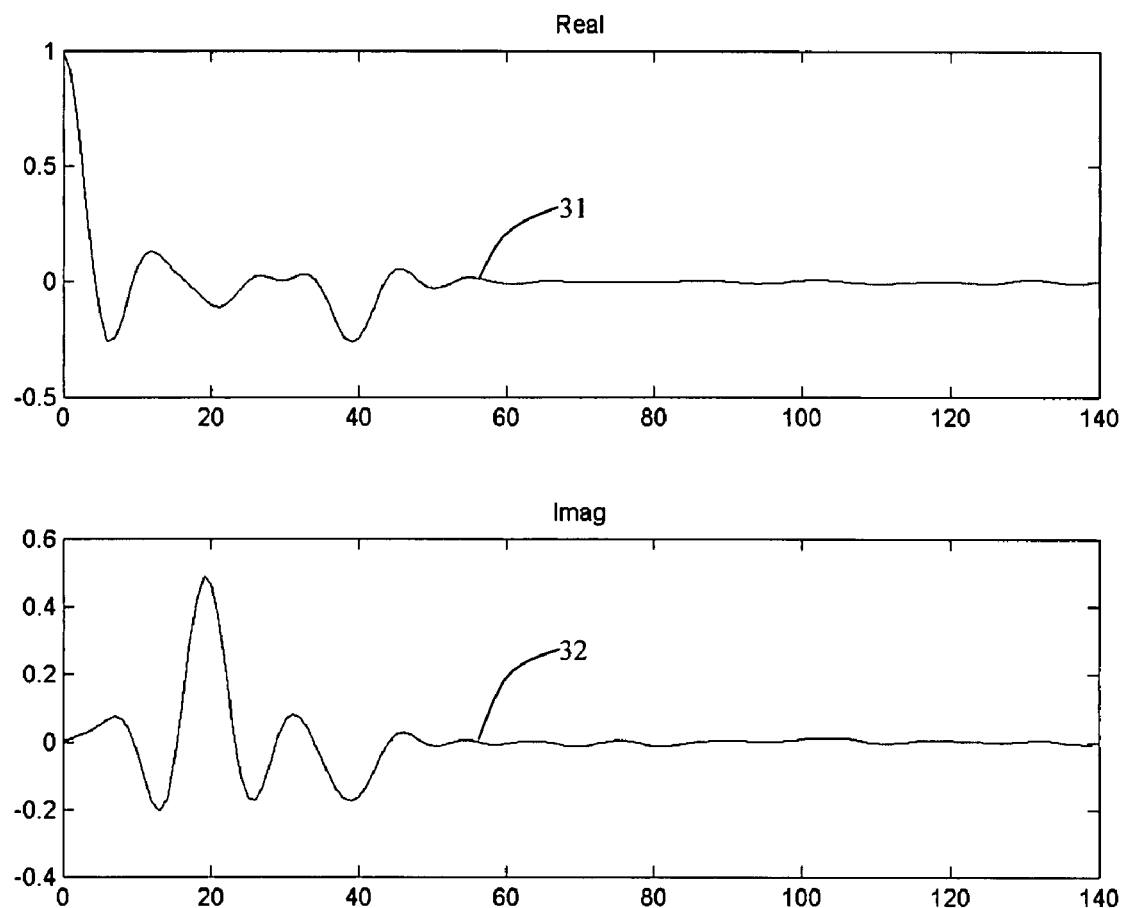
FIG. 3 is a graphical illustration showing auto-correlation of input signal x(t) including three multipath delays of 15, 18, and 39 samples (0.23 μs, 0.28 μs, and 0.6 μs).

A simulation of the approach has been performed. The sampling rate of the digital signals is 65 MHz. The number of the frequency samples used in the power spectrum measurements is 4096, which provides a frequency resolution of about 15.9 kHz. The input signal, x(t), is a random noise band-limited to 15 MHz. It is intended to simulate three 5 MHz Wideband CDMA (WCDMA) carriers of equal power. The signal is filtered further to simulate multipath fading from the base station to the repeater. The three multipath delays are 0.23 µs, 0.28 µs, and 0.6 µs, respectively. The auto-correlation of the input signal, including multipath, is shown in FIG. 3 as curve 31 for the real component, and curve 32 for the imaginary component. Note that the multipath delays are not related to the loop delay associated with the feedback of the antenna coupling.

Figure 4:
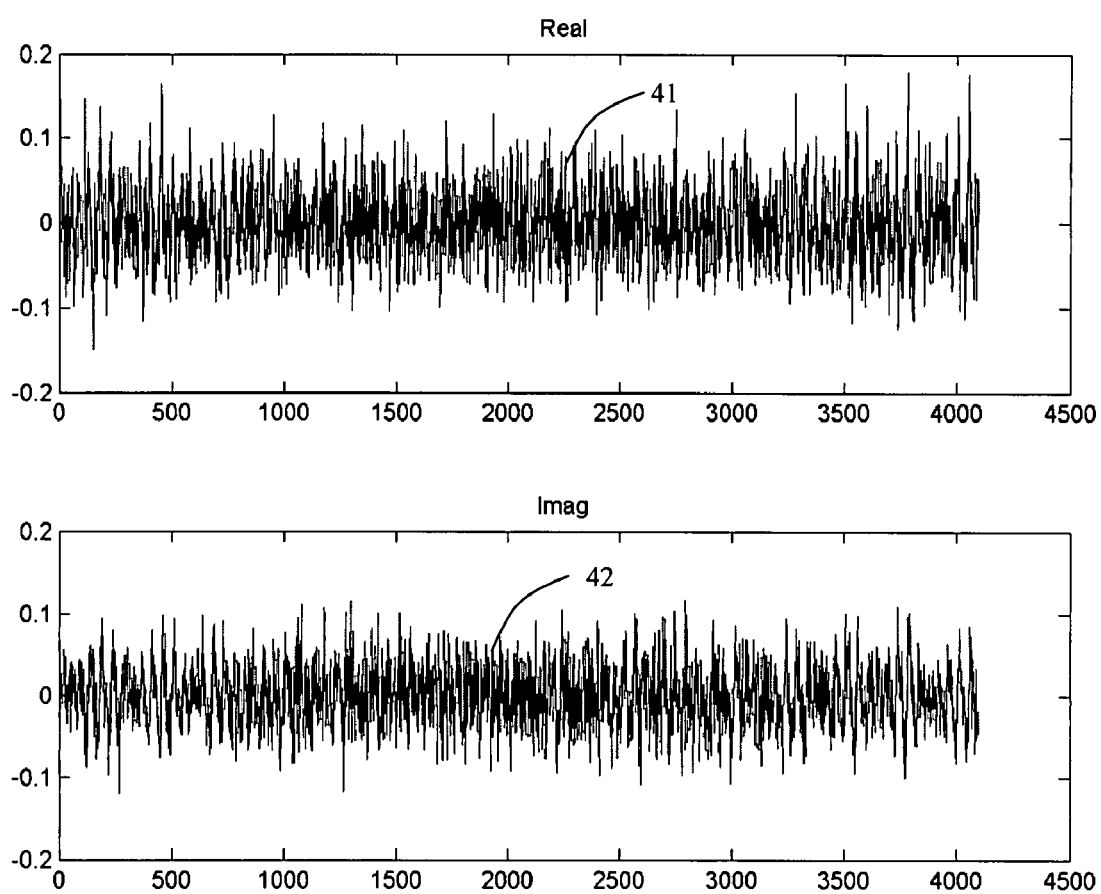
FIG. 4 is a graphical illustration showing $M(\omega_k)$ for an external feedback coupling whose dominant delay taps are $[T_1\ T_2\ T_3\ T_4]=[74\ 75\ 90\ 91]$, and the respective coefficients are $[a_1\ a_2\ a_3\ a_4]=[j0.01\ j0.01\ 0.015\ 0.015]$.

In the simulation, the dominant delay taps are $[T_1\ T_2\ T_3\ T_4] = [74\ 75\ 90\ 91]$, and the respective coefficients are $[a_1\ a_2\ a_3\ a_4] = [j0.01\ j0.01\ 0.015\ 0.015]$. The nominal forward gain, $C_0$, is set to 10 (with $G_0 = 1$). The real component of the variable gain, $\text{Re}\{C\}$, is swept from $0.85\ C_0$ to $1.15\ C_0$ and back to $0.85\ C_0$ in increments of $0.0375\ C_0$. The imaginary component, $\text{Im}\{C\}$, is swept from $(1-j0.15)\ C_0$ to $(1+j0.15)\ C_0$ and back in increments of $j\ 0.0375\ C_0$. The measurement, $M(\omega_k)$, obtained using (Eq. 27) and (Eq. 28), is shown in FIG. 4 as curve 41 for the real component, and curve 42 for the imaginary component.

Figure 5:
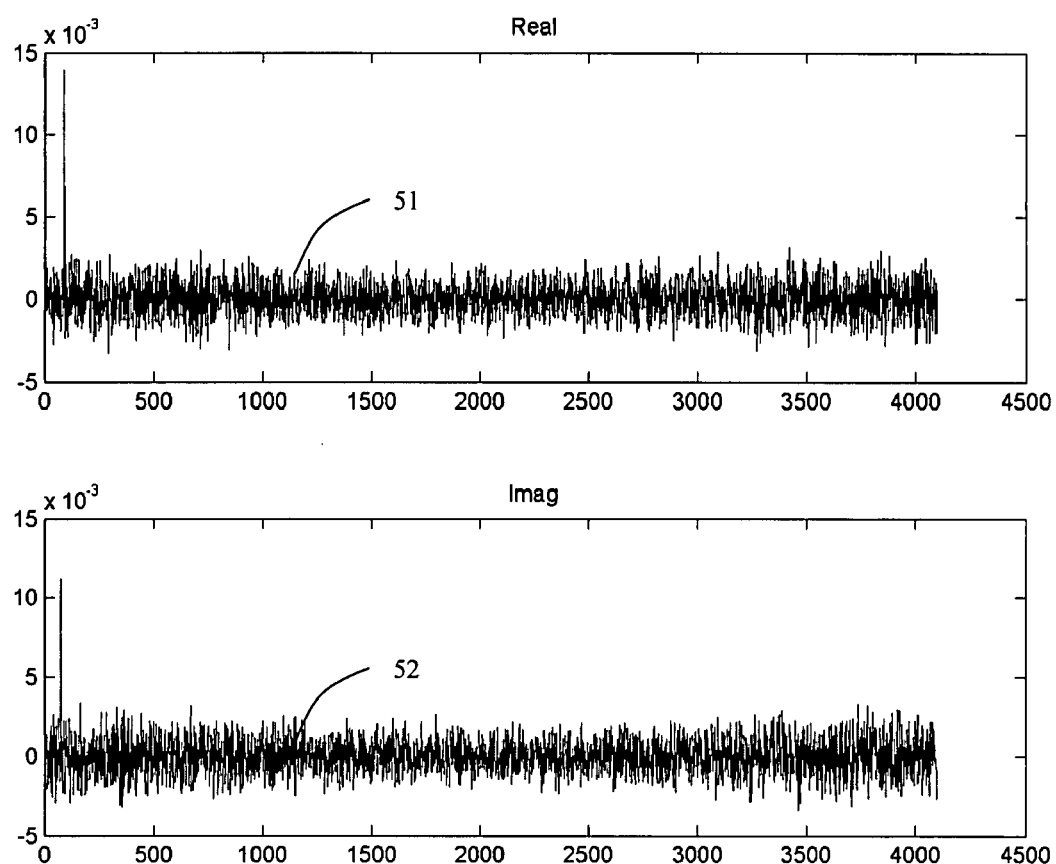
FIG. 5 is a graphical illustration showing an estimate of the residual feedback coupling coefficients, $\Delta b_n$ (inverse FFT of $\Delta H(\omega_k)$). The horizontal axis is time (sample interval of $\Delta T=1/65$ MHz).
Figure 6:
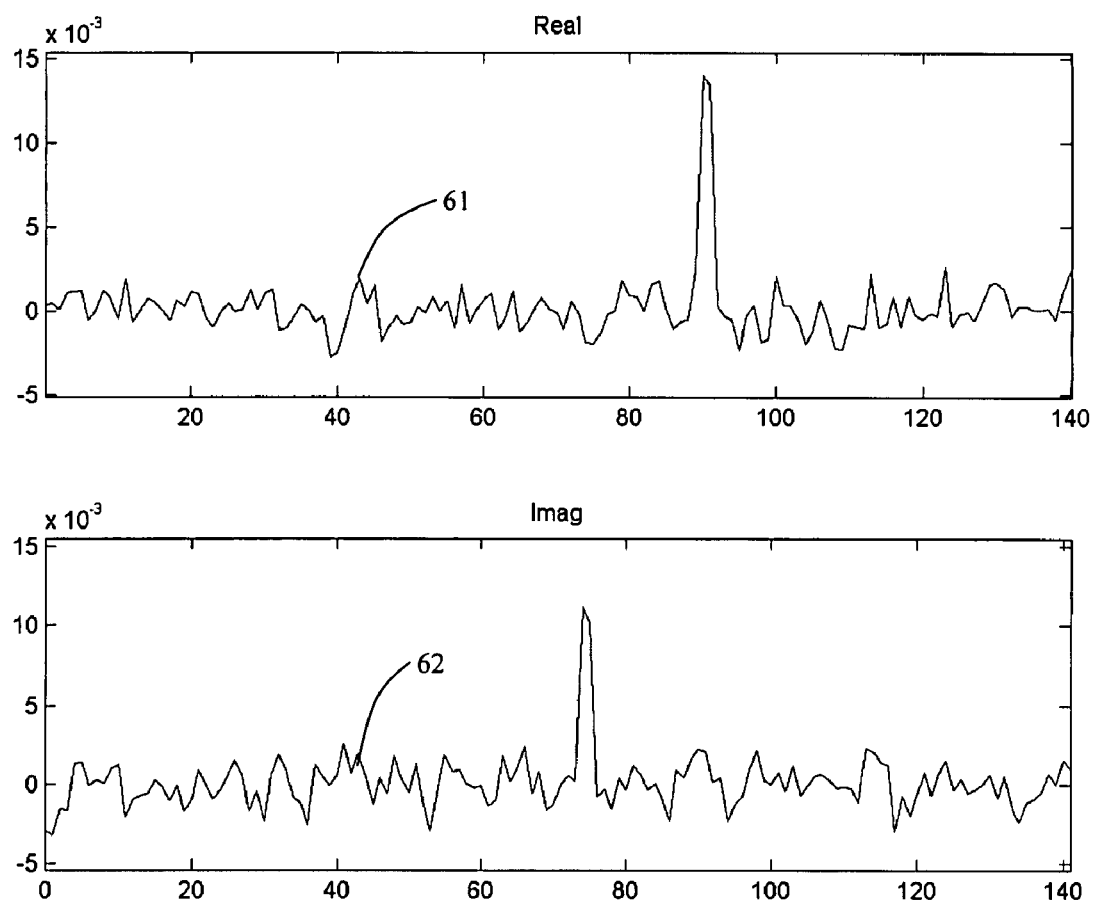
FIG. 6 is a graphical illustration showing an expanded view of the residual feedback coupling coefficients, $\Delta b_n$. The horizontal axis is time (sample interval of $\Delta T=1/65$ MHz).

The frequency response of the residual feedback, $\Delta H(\omega)$, is computed from $M(\omega)$ using (Eq. 14), where $G_0 C = C_0$. The residual coupling is computed using (Eq. 25) for $T_n = 0$ to 4095 (using the IFFT function). The residual coupling is shown in FIG. 5 as curve 51 for the real component, and curve 52 for the imaginary component. FIG. 6 shows an expanded view of the dominant delay taps, including the real component 61 and the imaginary component 62. In this example, the dominant delays are defined as having magnitudes $|\Delta b_k| > 0.006$. This predetermined threshold corresponds to 3 times the mean value of $|\Delta b_n| = 0.002$, where the mean is measured over the range of expected delay values. The estimated dominant delays are $T_n = [74\ 75\ 90\ 91]$ (see FIG. 6), which matches the model used in the simulation. The corresponding residuals are $\Delta b = [(-0.0018+j0.0112)\ (-0.0019+j0.0102)\ (0.0140+j0.0022)\ (0.0134+j0.0021)]$. The actual feedback coupling used in the simulation is $a_n = [j0.01\ j0.01\ 0.015\ 0.015]$ where $T_n = [74\ 75\ 90\ 91]$.

It is interesting to compare the auto-correlation of the input signal with multipath fading (see FIG. 3) with the estimated residual feedback coefficients (see FIG. 6). This illustrates that the first 40 delay taps are largely unaffected by the auto-correlation of the input signal. This is considered desirable because the multipath fading is not dependent on the antenna coupling of the repeater. The multipath fading is corrected at the receiver of the base station or the mobile.

The above example shows the estimate of the residual feedback coefficients for the first iteration. With this estimate, the model of the feedback, $H_{est}$, is formed. Initially, all of the coefficients of $H_{est}$ are set to zero. The estimate of the residual coefficients is used in (Eq. 24) to update the model; however, only the dominant delay taps are updated to reduce the effects of input signal spectrum variation. In subsequent iterations, new dominant delay taps may be identified. In such cases, the dominant delay taps identified in the first and subsequent iterations are updated. However, as the iterative process converges, the estimated residual feedback decreases due to the compensation provided by $H_{est}$, reducing the probability to finding new dominant delay taps.

The update process, as described above, can only increase the number of dominant modes. However, to reduce the computational burden on the DSP, it is desirable to limit the number of dominant delay taps. If the number of dominant delay taps becomes larger than desired, the coefficient $b_n$ with the smallest magnitude may be removed from the model $H_{est}$ (which effectively sets the coefficient to zero).

Figure 7:
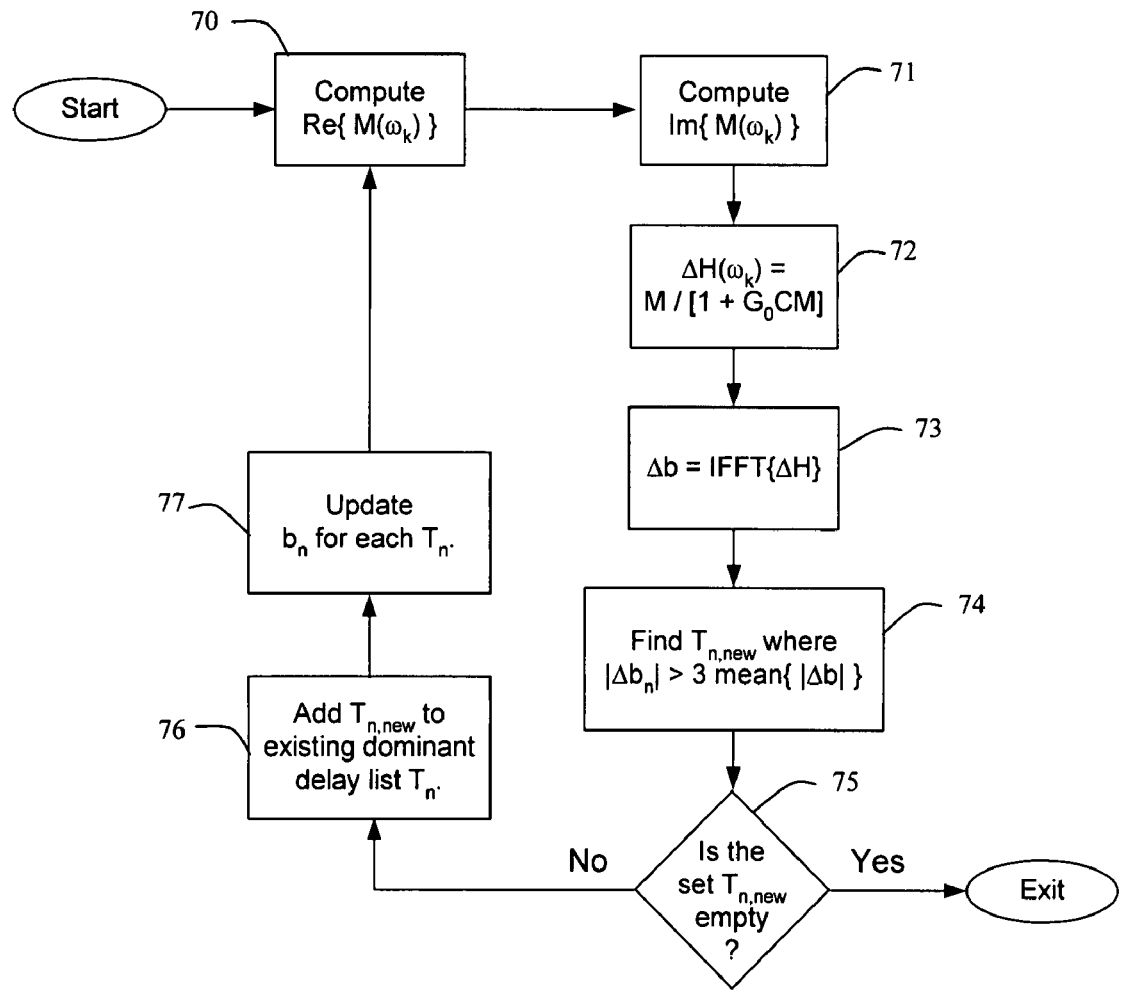
FIG. 7 is a block schematic drawing of a dithering algorithm for determining the dominant loop delays and obtaining initial estimates of the feedback coefficients.

The flow of the algorithm is shown in FIG. 7. The spectra $M(\omega_k)$ and $\Delta H(\omega_k)$ are computed in steps 70, 71, and 72. The estimate of the residual coefficient $\Delta b$ is obtained through inverse Fourier transforming $\Delta H$ in step 73. Significant residual coefficients, $|\Delta b_n|$, having amplitudes greater than a predetermined threshold, are found in step 74. The predetermined threshold in this case is set to be 3 times the expected value of the amplitude, $\text{mean}\{|\Delta b|\}$, as measured using averaging over the range of possible loop delays. The corresponding loop delays are referred to herein as "dominant delay taps," $T_{n,new}$, and are accumulated in a list. If the list is not empty as judged in step 75, $T_{n,new}$ is added to existing dominant delay list $T_n$ in step 76. Residual coefficients associated with the dominant delay list are used to update the coefficient estimate $b_n$ in step 77, and steps 70-74 are repeated until no significant residual coefficients are found amongst the possible loop delays. Within the dithering approach, it is usually assumed that the possible loop delays, $T_n$, are larger than the time dispersion of the input signal (which is approximately equal to the longest multipath delay).

Figure 8:
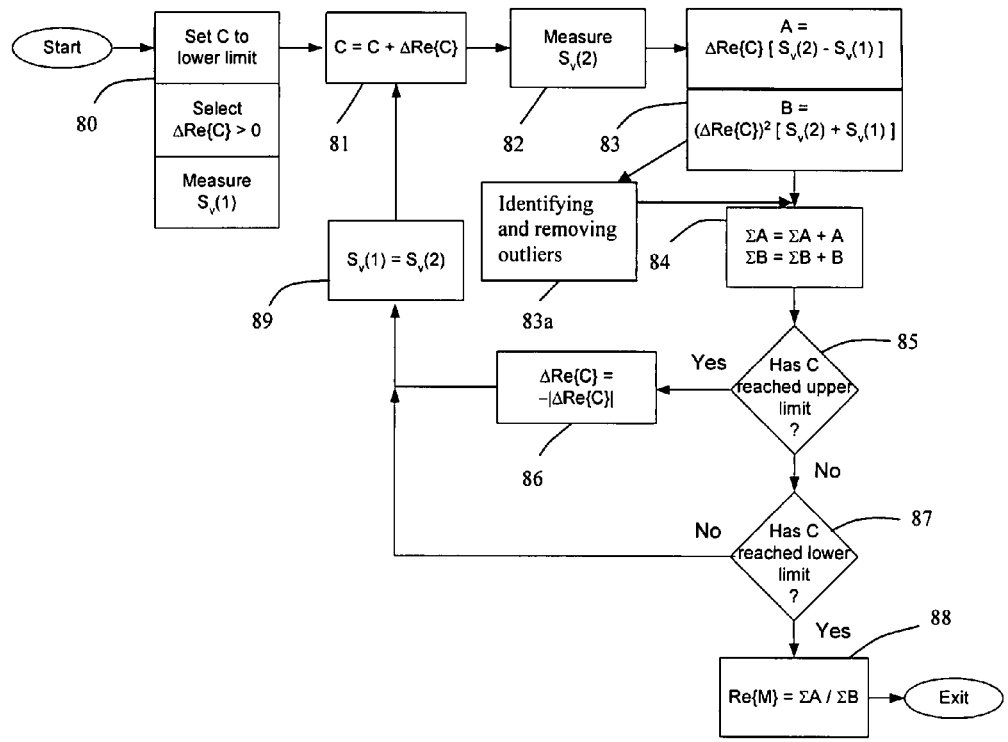
FIG. 8 is a block schematic drawing showing the computation of Re{M} used in the dithering algorithm of FIG. 7.

The computation of the real component of $M(\omega_k)$ in step 70 is shown in detail in FIG. 8. Basically, Re{C} is adjusted between measurements of the spectrum $S_v(\omega_k)$, and the dithering pattern should be selected such that the average value of C is $C_0$. Within FIG. 8, Re{C} is ramped up and down starting at a lower limit of C, increasing to an upper limit, and then returning to the lower limit. It is also possible to ramp Re{C} in one direction if desired.

In the exemplary case shown in FIG. 8, in step 80, C is first set to its lower limit, and a larger-than-zero ΔRe{C} is selected, followed by a first measurement of the power spectrum, $S_v(1)$. C is ramped up by the value of ΔRe{C} in step 81. The power spectrum is measured again in step 82 to obtain $S_v(2)$. A function of the difference between $S_v(2)$ and $S_v(1)$, A=ΔRe{C} [$S_v(2)-S_v(1)$], and a function of the sum, B=|ΔRe{C}|² [$S_v(2)+S_v(1)$], are calculated in step 83. It is recommended that the values of A($\omega$) be tested for validity in step 83a before the integration (ΣA and ΣB) in step 84; a large value of A($\omega$) may be an indication for an outlier in the measurement that may need to be removed in step 83a. An outlier is also indicated by a large magnitude of the differential auto-correlation, $\Delta\rho(\tau)$=IFFT{$S_v(2)-S_v(1)$}, for any delay $\tau$ less than the minimum insertion delay of the repeater, $T_{min}$.

If the value of C has reached its upper limit as judged in step 85, a negative, −|ΔRe{C}|, is set in step 86 for the next change of C. If, on the other hand, C has reached its lower limit as judged in step 87, the value of Re{$M(\omega_k)$} is obtained using ΣA/ΣB. Otherwise, $S_v(1)$ is given the value of $S_v(2)$ in step 89, and steps 81-84 are repeated.

The computation of the imaginary component of $M(\omega_k)$ (not shown) is substantially the same as the real component, except that Im{C} is ramped up and down instead of Re{C}. The average values of C should be $C_0$, as in the case of the real component computation.

Figure 9:
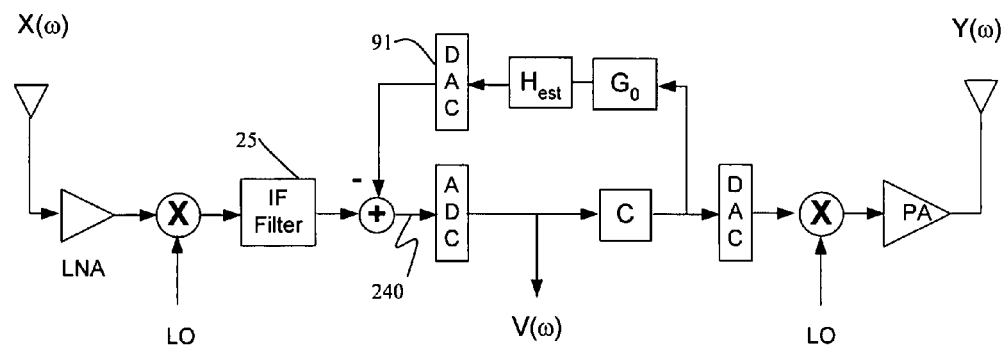
FIG. 9 is a block schematic drawing of a repeater employing DSP-based compensation where the correction is applied at IF after the IF filter, in accordance with an embodiment of the invention.
Figure 10:
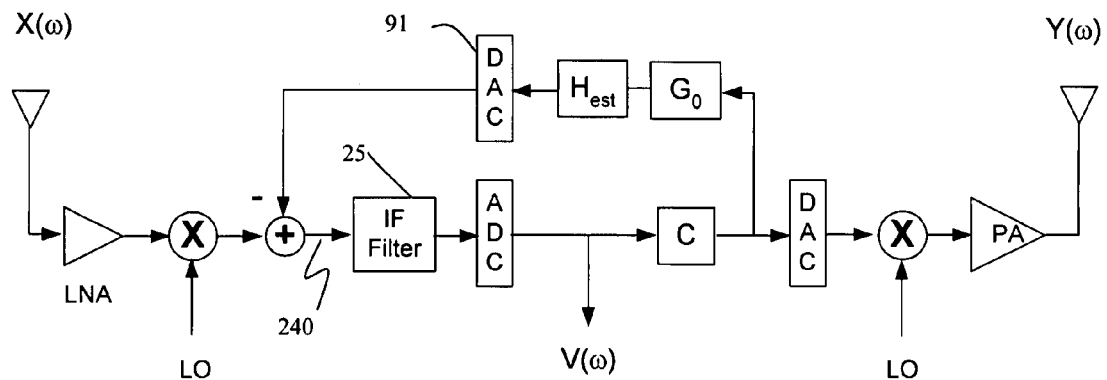
FIG. 10 is a block schematic drawing of a repeater employing DSP-based compensation where the correction is applied at IF before the IF filter, in accordance with an embodiment of the invention.
Figure 11:
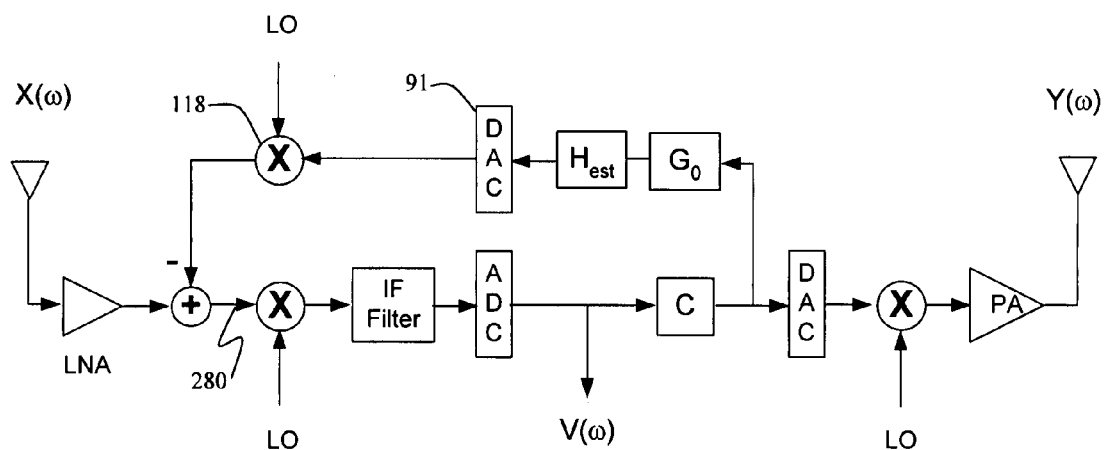
FIG. 11 is a block schematic drawing of a repeater employing DSP-based compensation where the correction is applied at RF, in accordance with an alternate embodiment of the invention.

Some other embodiments of the invention are shown in FIGS. 9, 10, and 11. In the embodiments of FIGS. 9 and 10, the digital signal from the DSP is converted to an analog signal using a DAC 91, and is then coupled to the IF path 240 of the repeater. The difference between these embodiments is whether the coupling to the IF path is located after (FIG. 9) or before (FIG. 10) the IF filter 25.

In FIG. 11, the DSP-based compensation signal is converted to an analog signal using a DAC 91, up-converted to RF using an up-converting mixer 118, and then coupled to the RF path 280 of the repeater. The advantage of subtracting the compensation at IF or RF may include a relaxed dynamic range requirement at the ADC 26, although additional components, such as the DAC 91, coupler, and possibly an up-converting mixer 118, may be needed. In each case, the method for estimating the feedback coupling $H_{est}$ remains the same as described above.

It will be appreciated by those skilled in the art that the foregoing embodiments are purely illustrative and not limiting in nature. A variety of modifications are possible while remaining within the scope of the present invention.

The present invention has been described in relation to a presently preferred embodiment, however, it will be appreciated by those skilled in the art that a variety of modifications, too numerous to describe, may be made while remaining within the scope of the present invention. Accordingly, the above detailed description should be viewed as illustrative only and not limiting in nature.

What is claimed is:

1. A method for estimating a coupling between an input antenna and an output antenna of an on-frequency repeater, comprising:
    measuring a signal in a signal path of the on-frequency repeater;
    dithering a forward gain of the signal path; and
    calculating iteratively the coupling based on the measured signal and the dithered forward gain;
    wherein calculating iteratively the coupling comprises:
    calculating a residual feedback coupling;
    finding significant residual coefficients;
    obtaining a list of dominant delay taps corresponding to the significant residual coefficients;
    updating residual coefficients based on the list of dominant delay taps; and
    repeating the above steps using updated residual coefficients until the list of dominant delay taps is empty.

2. A method as set out in claim 1, wherein calculating the residual feedback coupling comprises:
    measuring a first power spectrum value of the signal in the signal path;
    varying a value of the forward gain;
    measuring a second power spectrum value of the signal in the signal path;
    calculating a first function using a difference between the first power spectrum value and the second power spectrum value;
    calculating a second function using a sum of the first power spectrum value and the second power spectrum value; and
    calculating the residual feedback using the first function and the second function.

3. A method as set out in claim 2, wherein varying the value of the forward gain comprises varying the forward gain between an upper limit and a lower limit, and wherein an average value of the varied forward gain is a nominal forward gain.

4. A method as set out in claim 2, further comprising removing an outlier in the measurement of the power spectrum.

5. A method as set out in claim 4, wherein the minimum delay through the repeater is $T_{min}$ and wherein removing an outlier comprises:
    calculating a differential auto-correlation of the measured first power spectrum and the measured second power spectrum of the signal in the signal path at varying time delays; and
    if the differential auto-correlation is larger than a predetermined threshold for a delay less than $T_{min}$, then removing the measured first power spectrum and the measured second power spectrum.

6. A method as set out in claim 1, wherein obtaining the list of dominant delay taps comprises identifying the dominant delay taps by comparing a value of a delay tap with a predetermined threshold.

7. A method as set out in claim 6, wherein the predetermined threshold is three times an average of the value of the delay tap.

8. A method as set out in claim 1, further comprising compensating for the coupling based on the iteratively-calculated coupling to reduce the coupling between the input antenna and the output antenna.

9. A method as set out in claim 8, further comprising increasing the forward gain of the repeater after the coupling is reduced.

* * * * *